United States Patent Office 2,991,493
Patented July 11, 1961

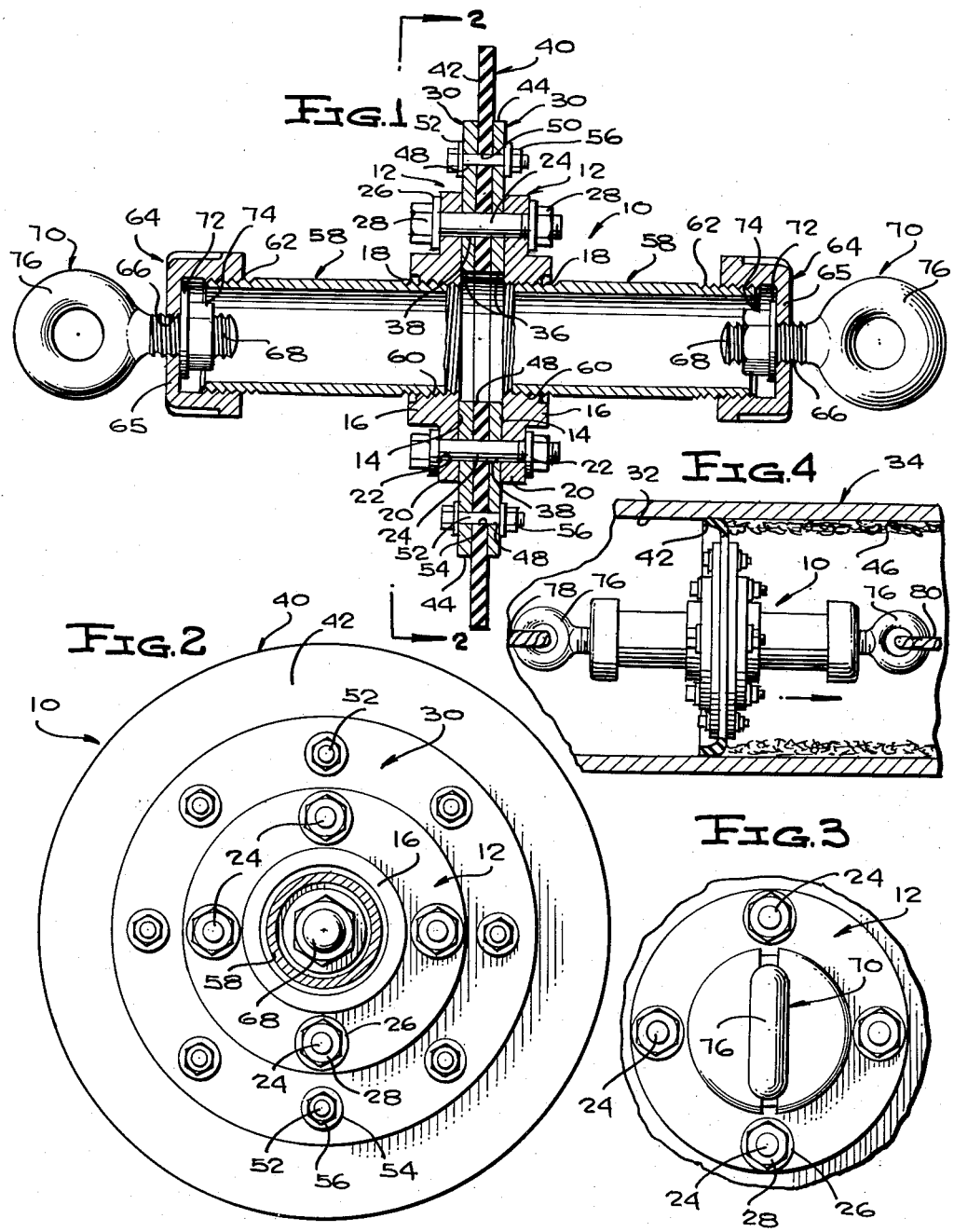

2,991,493
PIPE CLEANING DEVICE
Henry G. Haas, 820 W. Main St., Belleville, Ill.
Filed Aug. 7, 1959, Ser. No. 832,335
5 Claims. (Cl. 15—104.16)

This invention relates to an improved and reversible device for cleaning large diameter pipe, such as sewer pipe, by being pulled through the pipe, in either direction.

The primary object of the invention is to provide an efficient and rugged device of the kind indicated, which is of simplified construction, and which can be made of standard and readily available components at relatively low cost.

Another object of the invention is to provide a more easily serviced device of the character indicated above which can be easily disassembled and reassembled, to replace worn or damaged parts, and to enable readily substituting larger or smaller squeegee or wiper rings thereon, for the cleaning of larger or smaller diameter pipes.

Other important objects and advantageous features of the invention will be apparent from the following description and the accompanying drawings, wherein, for purposes of illustration only, a specific form of the invention is set forth in detail.

In the drawings:

FIGURE 1 is a longitudinal section, partly in side elevation, of a device of the invention;

FIGURE 2 is a vertical section taken on the line 2—2 of FIGURE 1;

FIGURE 3 is a fragmentary end elevation of FIGURE 1; and

FIGURE 4 is a fragmentary schematic view, partly in section, showing the device in operative position in a pipe to be cleaned, and connected to pulling cables.

Referring in detail to the drawings, wherein like numerals designate like parts throughout the several views, the illustrated device, generally designated 10, comprises a pair of similar axially spaced annuli, which can be standard pipe flanges 12, and which are reversed with respect to each other. The flat, unindented inner sides 14 of the flanges 12 face each other, and the hubs 16, which extend outwardly, have internally threaded bores 18, and the rims 20 of the flanges 12, which are displaced inwardly of and are smaller in cross section than the hubs 16, are provided with aligned circumferentially spaced bolt holes 22, through which clamping bolts 24 are extended, which have thereon washers 26, and nuts 28 threaded on their opposite ends.

Positioned against the inner sides 14 of the flanges 12 is a pair of similar axially spaced flat rigid rings 30, which are larger in diameter than the flanges 12, but smaller in diameter than the bore 32 of a pipe 34 to be cleaned.

The rings 30 having center openings 36 which are registered with the bores 18 of the flanges 12, and have inner bolt holes 38 which are registered with the flange bolt holes 22, through which the clamping bolts 24 extend. Positioned between and clamped between the rings 30 is a single resilient and flexible circular squeegee ring 40 which is larger in diameter than the rings 30 and has a freely flexible peripheral edge portion 42 which extends beyond the peripheral edge 44 of the rings 30. The squeegee ring is preferably made of rubber or rubber-like material, and is somewhat larger in diameter than the bore 32 of a pipe in which the device 10 is to be operated, so that the peripheral edge portion 42 is flexed to the side of the device 10 opposite to the direction of pull through the pipe, as shown in FIGURE 4, whereby accumulated matter 46, in advance of the device is scraped and pushed off the pipe bore and carried through the pipe to a clean-out (not shown).

The rings 30 have registered outer bolt holes 48, which are registered with holes 50 provided in the squeegee ring 40, at a location outwardly of the peripheral edge 44 of the rings 30 and inwardly of the peripheral edge portion 42, through which smooth outer clamping bolts 52 are extended, which have thereon washers 54, with nuts 56 threaded on their outer ends.

The squeegee ring 40 is preferably a relatively thick and flat body of uniform cross section, and has a center opening 48 which registers with the openings 36 of the rings 30, and the bores 18 of the flanges 12, as seen in FIGURE 1.

The device 10 further comprises a pair of similar, axially elongated shafts 58 preferably in the form of standard pipe nipples, having externally through inner and outer ends 60 and 62 respectively. The inner ends 60 are threaded into the bores 18 of related flanges 12. Threaded on the outer shaft ends 62 are similar caps 60, preferably standard pipe caps, which are formed in their webs 65 with threaded axial holes 66 through which the threaded shanks 68 of eye-bolts 70 are inwardly threaded, with washers 72 and lock nuts 74 threaded on their inners ends against the webs 65, and with their eyes 76 extending outwardly to be connected with cables 78 and 80, which extend through a pipe 34 in opposite directions, as shown in FIGURE 4. By alternately releasing and pulling on the cables 78 and 80, the device 10 can be worked through the pipe in opposite directions, at any location along the pipe, so that a more thorough cleaning job can be done than can be expected from operations of a one-way cleaning device.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A reversible pipe cleaning device comprising a pair of axially spaced annuli, axial shafts having inner ends secured to said annuli, said shafts having outer ends, cable connecting means on said outer ends, said annuli having inner sides, a pair of axially spaced rigid rings disposed between the annuli and being engaged with the inner sides thereof, said rings being larger in diameter than said annuli, a resilient and flexible squeegee ring disposed axially between said rigid rings, said squeegee being larger in diameter than said rigid rings and having a free flexible peripheral edge portion extending radially beyond said rigid rings, and clamping means extending through said annuli, said rigid rings, and said squeegee ring with the squeegee ring under compression.

2. In a reversible pipe cleaning device, a pair of axially spaced annuli having hubs having axial bores, shafts having inner ends fixed in said bores, said shafts having outer ends having cable connecting means thereon, a pair of axially spaced rigid rings disposed between said annuli and severally engaged with the inner sides of the annuli, said rings being larger in diameter than the annuli, an annular squeegee positioned between said rings, said squeegee being larger in diameter than the rings and having a flexible peripheral edge portion extending beyond the peripheral edges of the rings, and means rigidly assembling said squeegee, said rings, and said annuli together.

3. A reversible pipe cleaning device comprising a pair of axially spaced annuli, axial shafts having inner ends secured to said annuli, said shafts having outer ends, cable connecting means on said outer ends, said annuli having inner sides, a pair of axially spaced rigid rings disposed between the annuli and being engaged with the inner sides thereof, a resilient and flexible squeegee ring disposed axially between said rigid rings, said squeegee being larger in diameter than said rigid rings and having a free flexible peripheral edge portion extending radially beyond said rigid rings, and means clamping said annuli, said rigid rings, and said squeegee ring together with the squeegee ring under compression, said rigid rings being larger in diameter than said annuli and having peripheral edges spaced inwardly from the peripheral edge portion of the squeegee ring, said clamping means comprising main clamping bolts extending through said annuli, said rigid rings, and said squeegee ring.

4. A reversible pipe cleaning device comprising a pair of axially spaced annuli, axial shafts having inner ends secured to said annuli, said shafts having outer ends, cable connecting means on said outer ends, said annuli having inner sides, a pair of axially spaced rigid rings disposed between the annuli and being engaged with the inner sides thereof, a resilient and flexible squeegee ring disposed axially between said rigid rings, said squeegee being larger in diameter than said rigid rings and having a free flexible peripheral edge portion extending radially beyond said rigid rings, and means clamping said annuli, said rigid rings, and said squeegee ring together with the squeegee ring under compression, said rigid rings being larger in diameter than said annuli and having peripheral edges spaced inwardly from the peripheral edge portion of the squeegee ring, said clamping means comprising main clamping bolts extending through said annuli, said rigid rings, and said squeegee ring, and outer clamping bolts extending through said rigid rings and said squeegee ring and spaced outwardly from the annuli.

5. A reversible pipe cleaner comprising a pair of axially spaced annuli having axial openings, a pair of axially spaced rigid rings axially aligned with and engaged with the inner sides of the annuli, said rings being larger in diameter than the annuli and having axial openings larger in diameter than the openings of the annuli, a resilient and flexible squeegee ring axially aligned with and disposed between said rigid rings, said squeegee ring having an axial opening larger in diameter than the openings of the annuli, first bolt means traversing the rigid rings and the squeegee ring and securing the same together, second bolt means traversing the annuli, the rigid rings and the squeegee ring and securing the same together, and elongated shafts having outer and inner ends, the inner ends of the shafts being securably engaged in the openings of annuli, and cable connecting means on the outer ends of the shafts.

References Cited in the file of this patent

UNITED STATES PATENTS

| | | |
|---|---|---|
| 650,451 | Byers | May 29, 1900 |
| 1,065,174 | Schick | June 17, 1913 |
| 1,985,229 | Allen | Dec. 25, 1934 |
| 2,289,109 | Edward | July 7, 1942 |
| 2,580,727 | Bryan | Jan. 1, 1952 |
| 2,794,197 | Crane | June 4, 1957 |

FOREIGN PATENTS

| | | |
|---|---|---|
| 11,160 | Great Britain | May 12, 1906 |
| 13,518 | Great Britain | June 17, 1898 |
| 22,597 | Great Britain | Nov. 20, 1893 |
| 246,253 | Germany | Apr. 26, 1912 |